United States Patent [19]

Parra

[11] Patent Number: 5,168,471
[45] Date of Patent: Dec. 1, 1992

[54] INTEGRATED PASSIVE ACOUSTIC AND ACTIVE ULTRASONIC MARINE AQUATIC FINDER SYSTEM

[76] Inventor: Jorge M. Parra, 7332 Grand Blvd., New Port Richey, Fla. 34652

[21] Appl. No.: 792,219

[22] Filed: Nov. 6, 1991

Related U.S. Application Data

[63] Continuation-in-part of Ser. No. 744,505, Aug. 14, 1991.

[51] Int. Cl.$^5$ .............................................. G01S 15/96
[52] U.S. Cl. ...................................... 367/99; 367/124; 367/135
[58] Field of Search ................. 367/135, 136, 99, 116, 367/124

[56] References Cited

U.S. PATENT DOCUMENTS 3,870,988 3/1975 Turner ................................... 367/99

Primary Examiner—Daniel T. Pihulic
Attorney, Agent, or Firm—Jim Zegeer

[57] ABSTRACT

An integrated active/passive transducer system includes an active transducer for converting ultrasonic electric energy to pressure waves launched in a body of water and converting reflected ultrasonic pressure waves from a target in the body of water to a first electrical signal. A passive transducer coaxial with the active transducer, converting biosound pressure waves from a living organism in the body of water to second electrical signals. A first processing channel is connected to receive the first electrical signals and determine range to the target. A second processing channel is connected to receive the second eleectrical signals and provide a biosound signal. Logic system connected to receive the first electrical signal and said biosound signal, to validate that the target is a living organism and not an inanimate object only in the presence of biosound signals, and an indication is connected to the logic means for indicating that the target is a living organism. The logic system includes a microprocessor and a temperature sensor measures the temperature of the body of water contiguous to the transducers and produces an electrical signal corresponding thereto. The microprocessor is programmed to correlate the biosound signals with the thermotropic characteristics, etc., of the living organism.

10 Claims, 5 Drawing Sheets

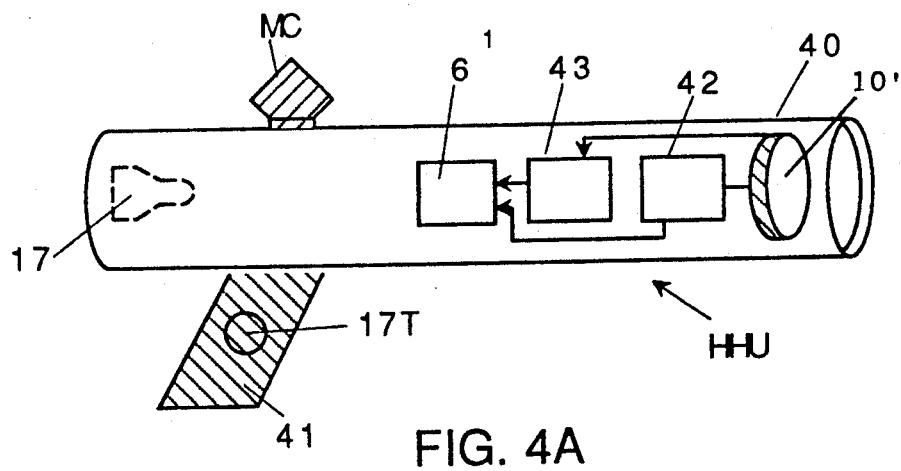
FIG. 4A
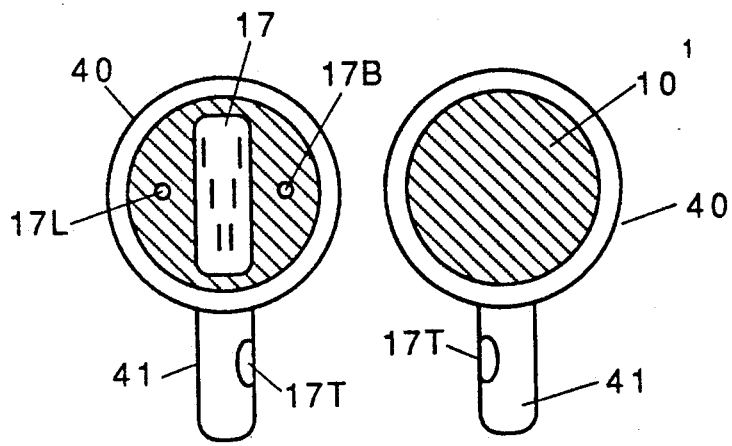
FIG. 4B  FIG. 4C
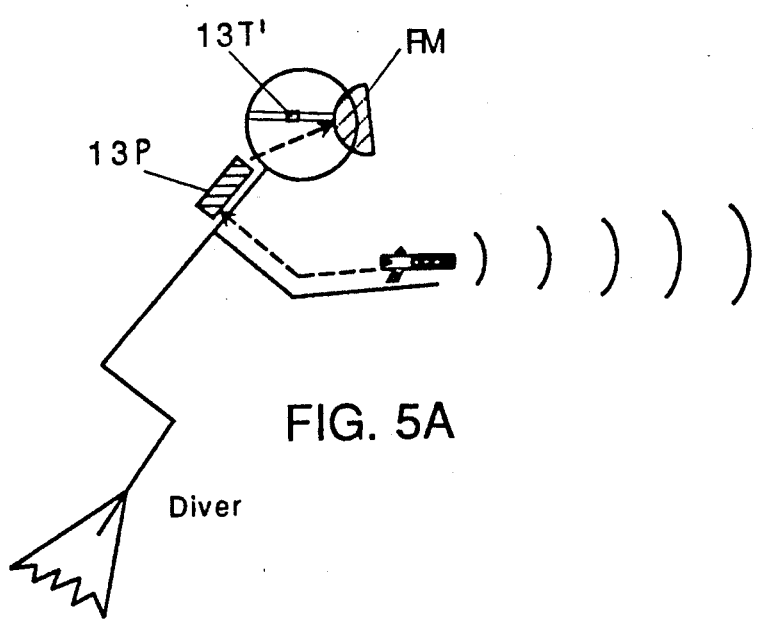
FIG. 5A
FIG. 5B

INTEGRATED PASSIVE ACOUSTIC AND ACTIVE ULTRASONIC MARINE AQUATIC FINDER SYSTEM

REFERENCE TO RELATED APPLICATIONS

This application is an improvement on my application Ser. No. 07/545,954 entitled "PASSIVE ACOUSTIC AQUATIC ANIMAL FINDER APPARATUS AND METHOD" filed Jul. 2, 1990, now U.S. Pat. No. 5,099,455 issued Mar. 24, 1992 which is incorporated herein by reference, and a continuation-in-part of my application Ser. No. 744,505 filed Aug. 14, 1991.

In my above-referenced application I disclose an improved low-cost passive acoustic aquatic animal detector and method which provides an indication of the presence of the aquatic animal, the direction or orientation thereof relative to the transducer, and range, as well as an indication of the type fish that is present. The operation of the passive acoustic aquatic animal detector is that the acoustic sounds are received by the passive transducer and the acoustic energy is converted to electrical energy which is then amplified and fed into a filter and phase locked loop discriminator section where the signal is bandpass filtered to remove unwanted background noise and man made interference noise and pass the desired biosound signals. The configuration of filters are in a cascaded high-pass/low-pass configuration to maximize attenuation outside the desired frequency. The phase locked loop is adjustable or programmed to pass a predetermined discrete pattern of electrical signals constituting a sonic profile, signature or imprint of a selected aquatic animal.

In my application Ser. No. 744,505, I disclose an active sonar system integrated with the passive system of my above application Ser. No. 07/545,954, now U.S. Pat. No. 5,099,455 and incorporated herein by reference. According to a preferred embodiment of the invention, a marine transducer is used to transmit acoustic impulse and receive echoes of acoustic impulses and ranging circuits determines acoustic travel time (or range) to a target, usually the bottom of the body of water and develop a profile of the bottom topography. When a single passive transducer is used, it is rotatable or orientable about an axis and by noting when the maximum amplitude signal is received, and the orientation of the transducer, the direction to the particular fish is indicated. An active transducer is used to measure the depth of the water below the transducers and produce a bottom surface profile. In a further embodiment, a plurality of passive transducers are spacedly mounted in array about an axis and the passive transducers are each sampled via a preamplifier which has its outputs connected to a series of analog gates, the analog gates being selectively activated so as to pass or sample, in any sequence desired, any signals received by the transducers. In this embodiment the active sonar transducer has its acoustic axis substantially normal with the scanning axis of the passive transducer so the passive transducers look to the sides of the location and the active transducer looks down.

The circuitry initially operates as a multiplexer with respect to each of the segments of the passive transducers and in effect, a scanning action can be obtained through any quadrant, group of quadrants or all of the quadrants and this is preferably be controlled by a microprocessor. Since the frequencies for the biosound transducers are much lower than those used for active transducers, it is preferred that separate transducers and front-end signal processors be used. However, a single transducer may be multiplexed for use to perform passive and active transducer functions when these frequency aspects are taken into account. The multiplexed passive transducer signals are amplified, applied to one or more bandpass filters and discriminators for indicating the presence of the fish, the species and for driving a display driver for indicating the distance to the fish as well as the direction. In this embodiment, the multiplexed signal is digitized in an analog-to-digital converter circuit supplied to a microprocessor which controls a voltage controlled oscillator and a counter circuit so that the maximum signal received by any one or two (or more) passive transducer segments can be utilized to indicate a precise direction to the a particular aquatic animal. The filter and discriminator functions as well as the range (passive and active sonar) determining function can be performed by a microprocessor. In this case, a library of aquatic animal sounds, signature or imprints for different fish and mammal species can be stored in a read-only memory, accessed by the microprocessor to determine the particular type fish sounds and mammal being received. The particular fish and/or mammal and direction thereof can be stored in a local memory (RAM) and presented to the user on a display (typically a small low cost dot matrix display liquid crystal display (LCD), plasma, or electroluminescent (EL)) indicating the type fish or aquatic animal in each direction, the range thereof and thus permit the fisherman to select which particular fish species of fish to go after and fish or mammals to avoid. The display can also provide the active sonar range information to the user. When the active transducer is oriented coaxial with scanning axis, depth information and bottom topography can be displayed. One or more active transducers oriented in the direction of the passive transducer to provide range measurements to fish, whose species have been identified by the passive system, or the passive and active transducer outputs can be used to validate each other. Thus, when an active sonar provides an echo indication of a fish, the passive transducer output can be used to verify the return as a live aquatic animal in the direction of the echo return and the species thereof.

THE PRESENT INVENTION

In the preferred embodiment of the present invention the active and passive transducers are integrated into a tandem coaxial system with the passive transducers being essentially transparent to the ultrasonic signals from the active transducer. The transducer output signals are processed in separate channels which are essentially controlled by a microprocessor. That is, a microprocessor controls the timing of operation each channel data processing and provides a logic function wherein the passive biosound channel provides a signal which must be present to validate the presence of a living organism, which is reflecting the ultrasonic pulses to the unit. The microprocessor includes a ROM memory unit in which is stored the biosound patterns of various fish species as well as other fishing variables (e.g., the thermotropic characteristics of various aquatic animals, their feeding habits, preferred depths and other fish information). Microprocessor 12 coordinates this information with the received sonic profile, signature or imprint of a selected aquatic animal.

The invention eliminates numerous false indications of fish presence, and in many cases, where the orientation of a fish relative to the active ultrasonic transducer provides "stealth" characteristics to the fish (e.g., it is essentially transparent to sonar), the present invention provides a positive identification.

In one embodiment, the system is incorporated in a unit with various forms of communicating information to the user can be utilized, depending on the particular use. For divers, a display mask, or a tactile communicator could be used. In the case of a hand-held unit, the data could be presented to the user by an LCD display, a flashing light, a buzzer or a tactile response in the handle or on the headband of the face mask. The invention is easily applicable to conventional downrigger systems, with or without automatic depth control. In large fish harvesting operations, the system of this invention can be carried on small remote control vessels which radio fish locations to a host or mother vessel. The system can be incorporated in passive towed array and coupled to a conventional automated downrigger system.

DESCRIPTION OF THE DRAWINGS

The above and other objects, advantages and features of the invention will become more apparent when considered with the following specification and accompanying drawings wherein:

FIG. 4a is a diagrammatic sectional view of a hand-held unit incorporating the invention, FIG. 4b is a rear view thereof showing an LCD-type display and FIG. 4c is a front view of the integrated transducer, FIG. 5a shows an embodiment of the invention for an underwater operation, and FIG. 5b shows positioning of the display in a mask.

DETAILED DESCRIPTION OF THE INVENTION

Figure 1:
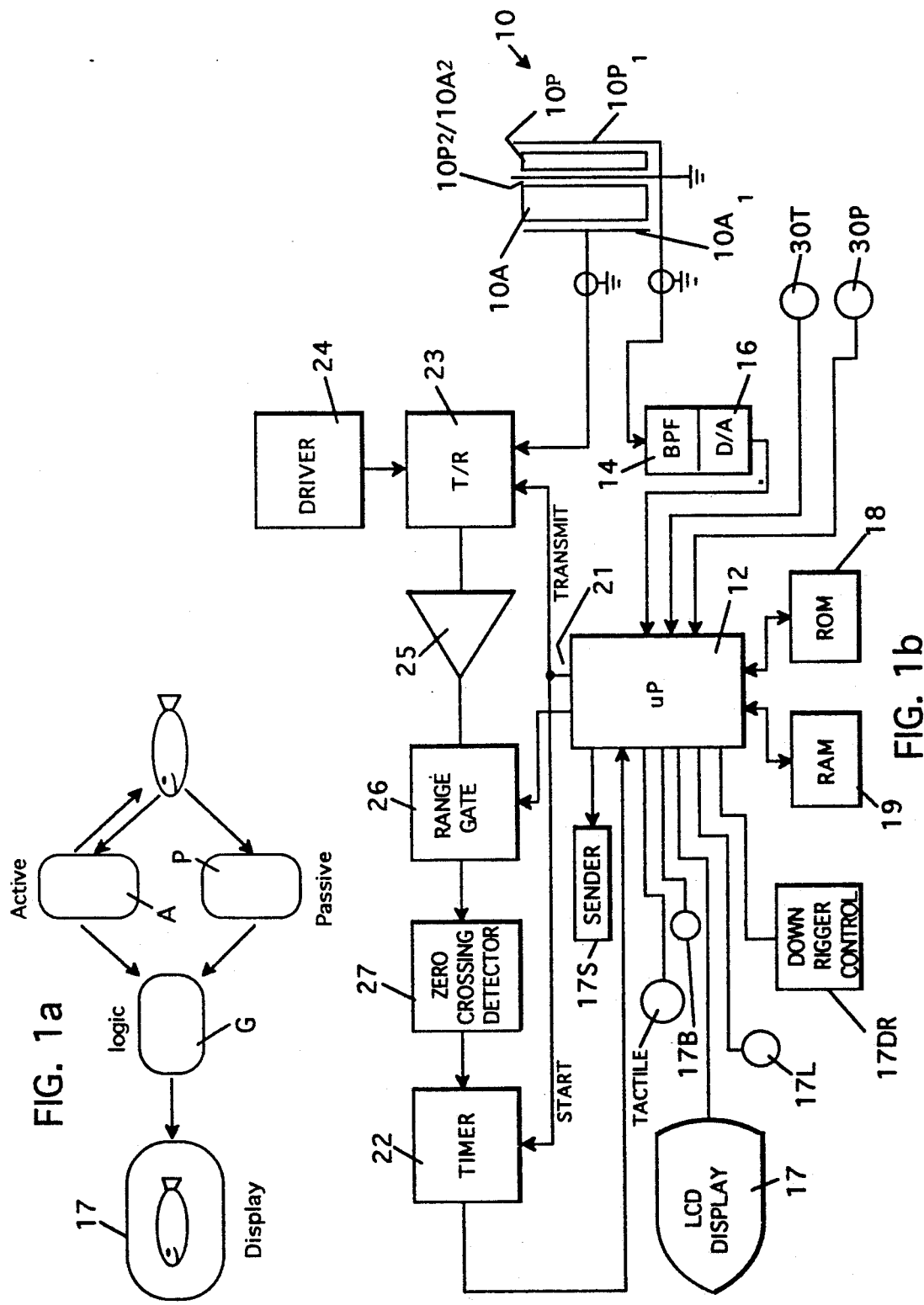
FIG. 1a is a broad block diagram of the active and passive transducers coupled by a computer logic system to an output device such as a display.
FIG. 1b is a detailed block diagram of the circuitry in one embodiment of the invention, FIG. 2 diagrammatically illustrates the coaxially oriented active and passive transducers independently transmit and sense received acoustic search signals and receive biosound signals, respectively.
Figure 2:
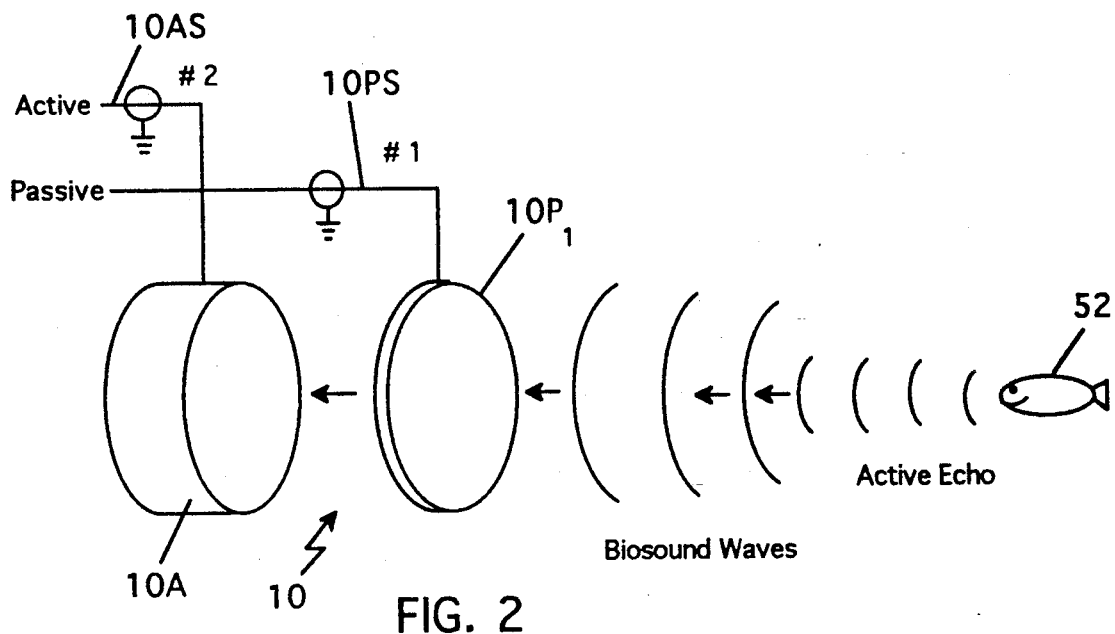

Transducer assembly 10 in FIG. 1b is used for two purposes:

1) as a biosound listening device, and
2) as a conventional echo sounder.

Figure 3:
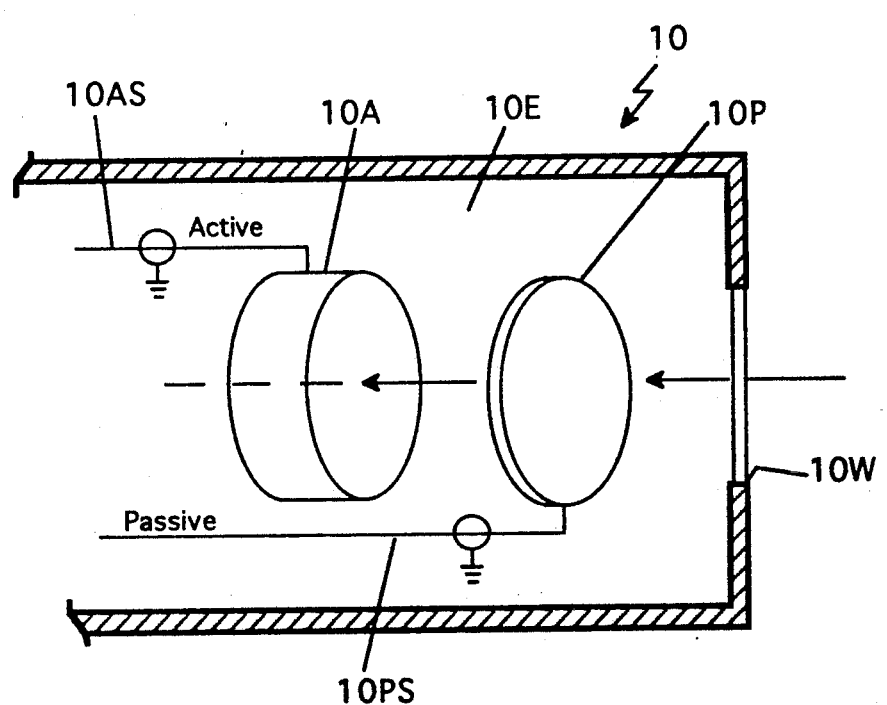
FIG. 3 shows the transducers in a common housing.

In this embodiment, it is constituted by coaxial, tandemly aligned active transducer 10A and passive transducer 10P in a common housing 10H (FIG. 3) and held or positioned in acoustic window 10W by an epoxy 10E. The transducer elements 10A and 10P are sandwiched between electrode pairs 10A1 and 10A2 on active transducer 10A and 10P1 and 10P2 on passive transducer 10P. Electrodes 10A2 and 10P2 serve as common and may be connected to the shield of a pair of coaxial lines or twin coaxial cable (twinax) with the shielded wires carrying the electrical signals to and from electrode 10A1 and from electrode 10P1, respectively.

Transducer 10A is a conventional ultrasonic crystal (various commercial units operate in the 120-455 kHz range). While transducer 10P could also be a crystal, in a preferred embodiment, it is a piezoelectric plastic (such as $PVF_2$ sold by the Pennwalt Corporation under their Kynar ® brand piezo-plastic which is a polarized homopolymer of vinylidine fluoride (PVDF) material, which are well known in the art) having a very low frequency response and at the same time, coupling the ultrasonic impulse to and from the ambient water. Transducer 10P operates in a very low frequency range, including the infrasonic range of biosounds (e.g., the range of frequencies made or emitted by fish, dolphin, whales, and other aquatic animals and human body sounds). The lower frequency biosound signals do not materially affect the high frequency response of transducer 10A. It will be appreciated that in some arrangements a non-coaxial, non-parallel orientation of the transducers (as disclosed in my application Ser. No. 744,505 can be used and, in fact, a single transducer element could be used. In such case, a mode selection circuit or switch (not shown), selectively controlled by microprocessor 12 could be used. Moreover, since the frequency ranges of interest are so diverse and separated, with proper filtering, the transducers could be operated simultaneously.

In FIG. 1a, active channel A transmits ultrasonic pressure waves oriented in a given direction and, if one or more fish are present, echo pulse is returned, processed and time or range signal supplied to a logic or gate circuit G, which may be incorporated in a microprocessor. Passive channel P listens for biosounds which are indicative of live fish and sends a presence signal to logic or gate circuit 6. In this embodiment, the presence of a signal from the passive or biosound channel is required (as a "go" "no go" signal) to provide an output from logic circuit G to a display or light, or a buzzer or some tactile indicator or combinations of these outputs. In the case of the hand-held units described later, the tactile indicator may be in the hand grip, or on the face mask or headband for the face mask or on the grip handle of a fishing rod.

In this tactile indicator embodiment, it is not necessary to identify the species of fish, but, fish species identification is provided in the preferred embodiment of the display D. Thus, by virtue of this invention, numerous false indications of presence of fish are eliminated since the positive echo returns and range measurements made by the active system in channel A requires the presence of a biosound signal from passive channel P to the logic circuit.

As shown in FIG. 1b, in the biosound mode (wherein soundwaves originating from a living organism in the water, such as an aquatic animal or human), are transduced to electrical signals supplied via bandpass filter 14 and digital-to-analog converter 16 to the microprocessor 12 for discrimination (see my applications Ser. No. 545,954 and Ser. No. 744,505) and identification thereby and display on an LCD display 17 and/or active buzzer B, and/or light L, and/or tactile element T. When the species of fish is desired, a read-only memory 18 is used to store the biosound patterns of various species of aquatic animals and also the biosound patterns of humans. Temporary data storage of temperature, depth of downrigger (FIG. 7), pressure reading, acoustic signature of fish in the passive channel, physical location, etc., may be made in random access memory (RAM) 19.

In the echo sounder channel mode, transducer 10 is energized to transmit an ultrasonic search pulse or "ping" and listen for an echo or reflected ultrasonic pulse. In this mode, microprocessor controller 12 sends a start/transmit signal to start timer 22 and simultaneously to the transmit receive (T/R) switch 23 to couple ultrasonic driver 24 to active element 10A of integrated transducer 10. After transmission of the ultrasonic drive signal to transducer 10, and launching of the ultrasonic search pulse, T/R switch 23 reverts to its receive mode and any ultrasonic echo is passed to amplifier 25. Microprocessor controller 12 operates a conventional range gate 26 a selected time period after launching of the ultrasonic search pulse and holds the range gate 26 open for a predetermined interval. A conventional AGC circuit (not shown) may be incorporated in the active transducer circuit. The echo signal from range gate 26 is supplied to zero crossing detector 27 which outputs a "stop" signal to timer 22 which makes the time measurement (e.g., time to and from a target). Thus, the active mode is used to determine range, with the speed of sound in water at a given temperature, salinity, etc., being calculated by microprocessor 12 in conventional fashion and displayed on display 17.

Temperature sensor 30T is located adjacent integrated transducer 10 so that it is at the level or depth thereof. It is well known that the accuracy of range measurements can be enhanced by adjusting the speed measurements to take into account variation in speed of sound in a given media due to temperature changes, and this well known function may be incorporated herein. However, according to the present invention, the temperature measurement is used as a further identifying indicia for locating specific aquatic animals and, in particular, a correlation is made between species of fish, temperature range at which are known to prefer and the type of "bait" fish in an area. The thermotropic character of fish and the temperature method tracking fish is described in detail in "Successful Downrigger Fishing" by Fred Olson, Copyright 1981, particularly pages 26–45, which describes how a fisherman can coordinate fishing variables. The present invention, in addition to providing a positive indication of the presence of and range to, a biosound source such as fish, also by means of microprocessor 12 and ROM 18 automates coordination of fishing variables to enhance the fisherman or underwater adventurer's skills and enjoyment. Thus, in addition to sounds made by fish species, their thermotropic character, feeding habits, etc., are likewise stored in ROM 18 and this information is used to validate the fish species identification made based on the biosonic profile also stored in ROM 18. It can also be used to locate fish of a particular species. Pressure measurements by transducer 30P and depth measurements made by a conventional depth finder (not shown) can be used to provide signals to downrigger control 17DR which maintains the depth of the unit constant (DB) relative to the bottom.

Figure 5C:
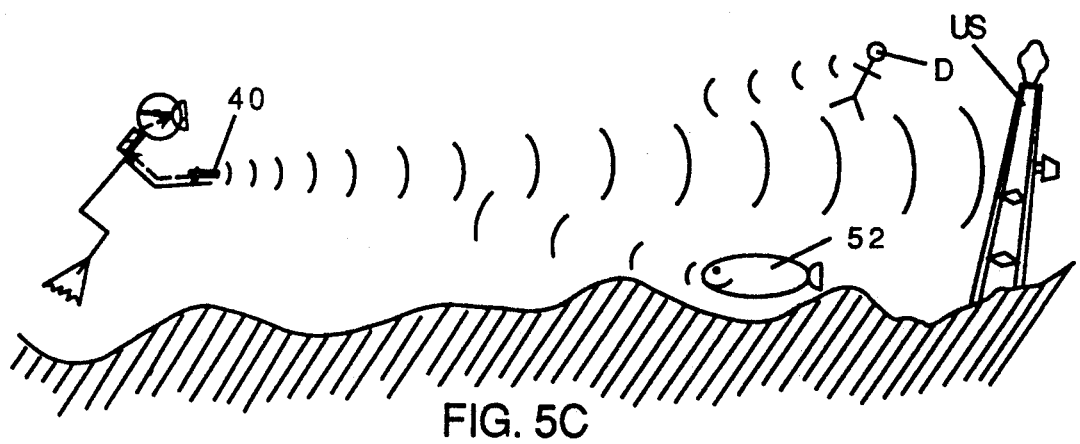
FIG. 5c shows a further application of the invention for underwater operation to detect aquatic animals, humans (conscious or unconscious) and underwater structures.

Referring to FIG. 4a, a hand-held unit HHU for divers and the like has a barrel housing 40 with handle 41, and a magnetic compass MC. An integrated unidirectional transducer 10' is coupled to echo sounder processor 42 and biosounder processor 43 (as shown in FIG. 1b), which in turn provide inputs to logic gate G in microprocessor 12 (FIG. 1b). A light signal 17L, and/or a sonic buzzer 17B, and/or tactile signal 17T on the handle may be activated to indicate to the user the presence of a biosound pattern of interest. The display (FIG. 4b) includes indicia of range to a target, nature of target (fish, human, etc.) and the compass MC indicates a magnetic heading to the target. A sonic sender (17S in Fib. 1b) could be included to apprise a host surface vessel of the findings of the diver as well as making a record thereof on the host vessel. As shown in FIG. 5c, the hand-held unit can be used to locate a diver emitting biosounds. It will be appreciated that the biosound portion of any embodiment disclosed herein could be disabled by a switch (not shown) and conventional echo sounder operation (and vice versa) utilized to locate and range an underwater structure US.

In FIGS. 5a and 5b, the display is mounted in the face mask FM of the diver, with the left side being clear. The head band HB of face mask FM can include a tactile indicator 13T' to physically communicate information to the diver. The tactile data can be in the form of coded pressure pulses on the right and/or left temples of the user, for example.

In this example, a rechargeable battery pack BP on the back (or belt) of the diver supplies electrical power for the unit.

Figure 6:
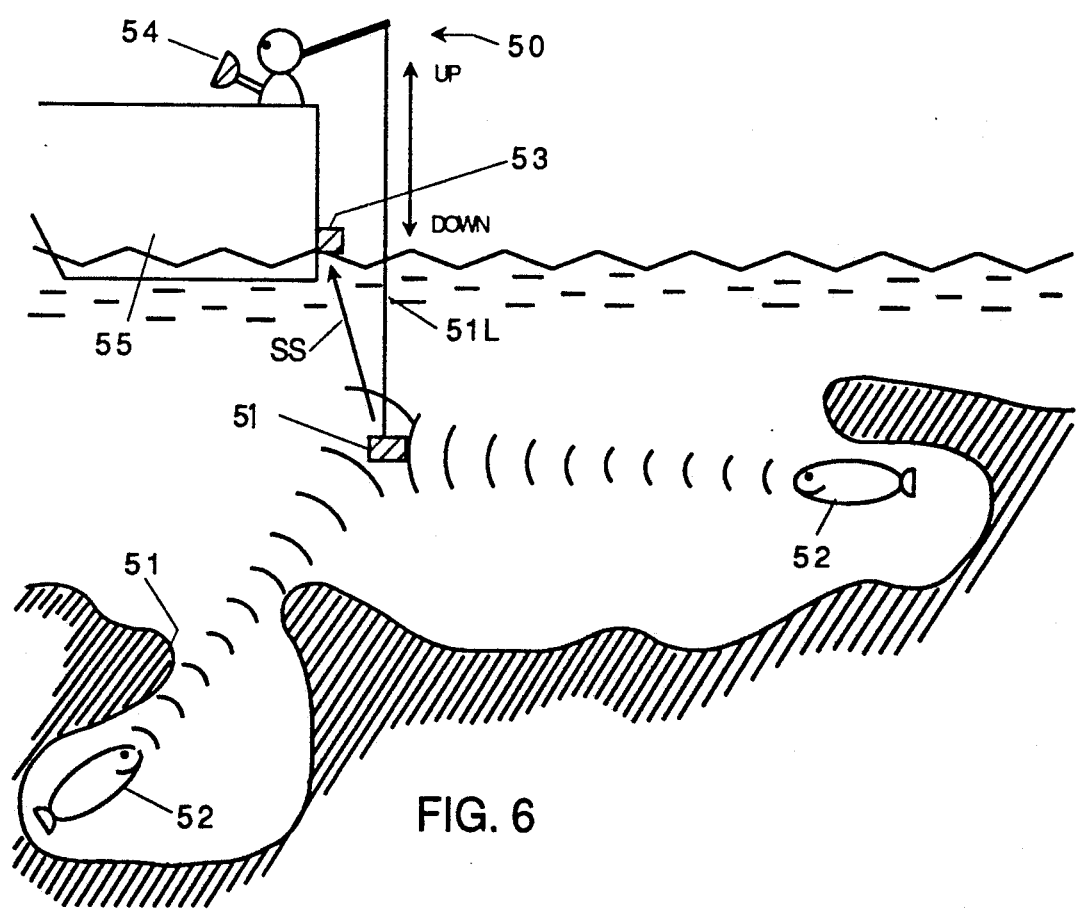
FIG. 6 shows an embodiment of the invention with a downrigger and a biosonic transducer with sender and a receiving transducer on a boat.

FIG. 6 illustrates a method and apparatus for the use of a simple manual downrigger equipped with bio-transducer 51 to detect aquatic animals 52 at a given location. Weighted bio-transducer 51 is lowered on line 51L from boat 55 by manual operation of downrigger hoist 50 to detect the presence of aquatic animals 52, i.e., fish, at a selected location. When one or more fish is detected, a coded sonic signal is produced by a sender 17S within the bio-transducer 51 and is picked up by the receiving transducer 53. This will activate a "go" signal which can be represented with an icon on an LCD display 54, or an audible "beep", or both, on display 54 mounted in the downrigger 50 or elsewhere. In this case, the transducer is omnidirectional and can be programmed to respond only to the acoustic bio-signature of a particular species, or to biosound identifying a genetic group. This system detects fish and other aquatic animals present under a ledge 56 or in an underwater cave 57, underwater grass, sea-weed, "fodder", etc., which are undetectable by conventional echo-sound fish finders. The above embodiment is very useful to divers and bottom fishermen.

Figure 7:
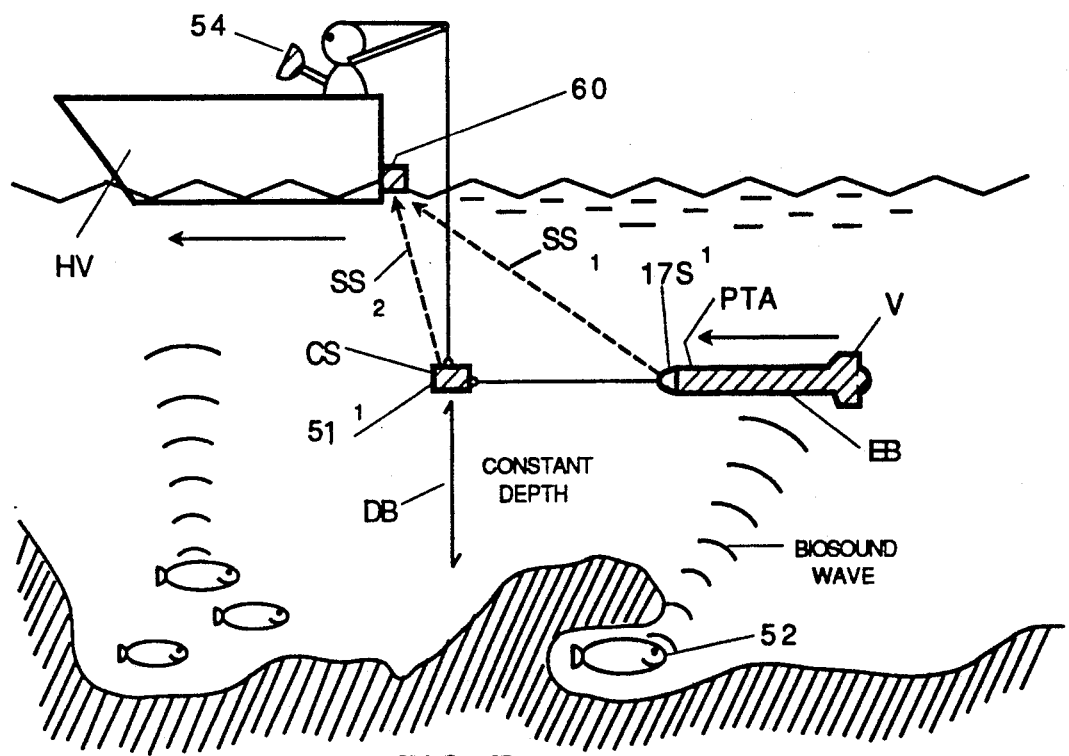
FIG. 7 shows an embodiment of the invention with an automatic downrigger and a biosonic transducer array with sender, FIG. 8 (prior art) shows a standard echo sonar scanning path.

FIG. 7 discloses a passive towing array PTA for detection of aquatic animals while host vessel HV is underway, using a conventional automatic depth control downrigger. The towing array PTA is equipped with a sonic signal sender 17S' which is activated when an aquatic animal, i.e., fish, is present. The sonic signal SS is picked up by a transducer in the host vessel thereby enabling a sound signal or icon display on an LCD screen mounted on the downrigger apparatus. The downrigger apparatus with automatic depth control 17DR (FIG. 1b) could be modified Canon Digitroll IV Downrigger, a Penn Model 625 Downrigger, or similar commercially available device.

Figure 8:
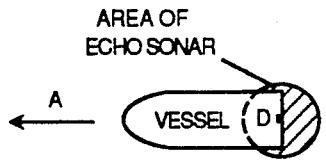
Figure 9:
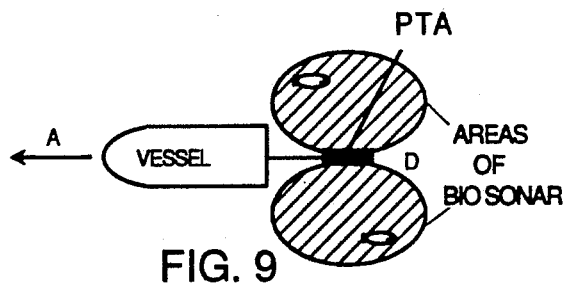
FIG. 9 shows the invention incorporated in a biosonar towing array and the area of coverage by the biosonar of this invention.

The configuration of the array as illustrated in FIG. 7 with elongated hydronamic body EB and guide fins or vanes V allows the vessel to travel at higher speeds without creating turbulence on the transducer surface. It trails weight 51' which has a conventional sender CS for automatic depth control. This biosonic device is generally an omnidirectional transducer with self-contained power, discriminator and sonic sender 17S'. The towing array transducer can be programmed with the acoustic bio-signature for the species of aquatic animals being sought. The "go/no go" discrimination is transmitted to the transducer 60 in the host vessel HV by sonic signal making unnecessary the use of electric cables between the array and the boat. The area of coverage for a standard echo sonar is shown in FIG. 8 and the area of coverage for biosonar of this invention is shown in FIG. 9. Note that a far larger search area is covered by biosonar as compared to echo sonar.

Since the distance DB between the array and the bottom is electronically controlled by the downrigger, the host vessel can travel at cruising speeds without fear of damage to the transducer through contact with the bottom. Therefore, while the boat is underway, the user can scan a wide area searching for a particular species, i.e., shrimp, schools of fish, etc., depending on the pre-programmed biosonic signature in the towing array.

Figure 10:
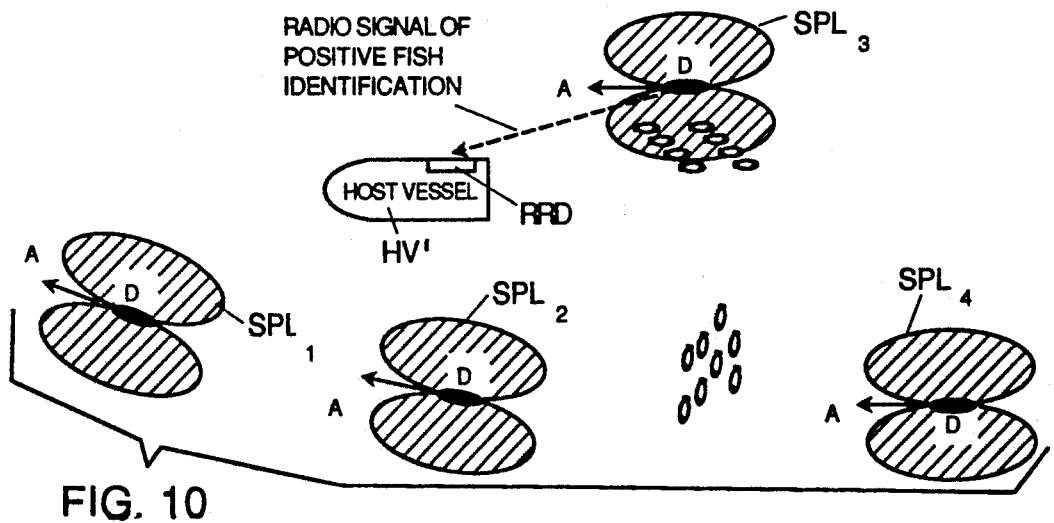
FIG. 10 shows a further embodiment of the invention in which self-propelled remotely controlled biosonar units are utilized with radio (or sonic) signals of a positive fish identification.

In FIG. 10, one or more biosonar arrays described above is mounted on one or more self-propelled launches SPL1, SPL2, SPL3, SPL4, etc., the movement and position of which is controlled by radio remote control RRD from a stationary or moving host vessel HV' thereby eliminating or greatly reducing fuel consumption by the host vessel while a search for aquatic animals is underway. Such self-propelled arrays could be deployed singly or in multiples with coded detection signals from each transmitted via radio to the host vessel. This "remote control" system will enable a vessel to search vast areas in the pursuit of aquatic animals for harvesting.

While there has been shown and described a preferred embodiments of the invention, it will be appreciated that other embodiments and adaptations will be apparent to those skilled in the art.

What is claimed is:

1. In combination, an integrated active/passive transducer system comprising an active transducer for converting ultrasonic electric energy to pressure waves launched in a body of water and converting reflected ultrasonic pressure waves from a target in said body of water to a first electrical signal, a passive transducer coaxial with said active transducer, for converting biosound pressure waves from a living organism in said body of water to second electrical signals, first channel means connected to receive said first electrical signals and determine range to said target, second channel means connected to receive said second electrical signals and provide a biosound signal and logic means connected to receive said first electrical signal and said biosound signal, to validate that said target is a living organism and not an inanimate object only in the presence of biosound signals, and means connected to said logic means for indicating that said target is a living organism.

2. The invention defined in claim 1 said living organism has thermotropic characteristics and said logic means includes a microprocessor, means for sensing the temperature of said body of water contiguous to said transducers and producing a water temperature signal corresponding thereto, said microprocessor being programmed to correlate said biosound signal sand water temperature signal with the thermotropic characteristics of said living organism.

3. The invention defined in claim 2 including means to sense the depth of water at said transducers and producing a corresponding electrical signal and supplying said corresponding electrical signal to said microprocessor for controlling the depth of said transducer system in said body of water.

4. The invention defined in claim 1 including tactile means for indicating presence of said living organism.

5. In combination, a biosound listening device adapted to be immersed in a body of water and produce electrical biosound signals, temperature sensing means for sensing the temperature of said water at the depth of immersion and producing a temperature signal, a read-only memory having stored therein biosound characteristic patterns of various fish and their respective thermotropic characteristics and a microprocessor connected to receive said electrical biosound signals and said temperature signals is programmed to correlate said biosound and temperature signals with the thermotropic characteristic of fish stored in said read-only memory.

6. The invention defined in claim 5 including means to sense the water pressure at said depth of immersion and producing a corresponding electrical depth signal and supplying same to said microprocessor for correlation with said biosound signals and said temperature signals.

7. The invention defined in claim 5 wherein said biosound listening device has an acoustic axis and includes an active ultrasonic sonar system including a transducer having an ultrasonic acoustic axis coaxially aligned with the acoustic axis of said biosound listening device and providing a range signal to said microprocessor, indicator means controlled by said microprocessor, and including logic means controlled by said biosound signal for indicating that said range is from a living organism.

8. The invention defined in claim 7 including tactile means for indicating the presence of fish in the direction of said acoustic axis.

9. The invention defined in claim 8 wherein said biosound listening device and said ultrasonic sonar system are contained within an elongated housing having an axis aligned with said acoustic axis so that the orientation of said elongated housing points in the direction of said living organism.

10. A method of validating that an ultrasonic echo sounder echo is that of a living aquatic animal comprising providing an active ultrasonic echo sounder transducer and a passive biosound transducer, aligning said transducers along substantially parallel axes, supplying electrical signals from said transducers to a logic system such that there is an indication of a living aquatic animal by said active ultrasonic sonar only in the presence of an electrical biosound signal to said logic system from said passive biosound transducer.

* * * * *